United States Patent
Okada et al.

(10) Patent No.: US 8,758,722 B2
(45) Date of Patent: Jun. 24, 2014

(54) METHOD FOR PRODUCING HYDROGEN AIMED AT STORAGE AND TRANSPORTATION

(75) Inventors: Yoshimi Okada, Yokohama (JP); Masashi Saito, Yokohama (JP); Shuhei Wakamatsu, Yokohama (JP); Mitsunori Shimura, Yokohama (JP)

(73) Assignee: Chiyoda Corporation, Yokohama-shi (JP)

( * ) Notice: Subject to any disclaimer, the term of this patent is extended or adjusted under 35 U.S.C. 154(b) by 0 days.

(21) Appl. No.: 13/580,643

(22) PCT Filed: Mar. 24, 2011

(86) PCT No.: PCT/JP2011/057149
§ 371 (c)(1),
(2), (4) Date: Aug. 22, 2012

(87) PCT Pub. No.: WO2011/122434
PCT Pub. Date: Oct. 6, 2011

(65) Prior Publication Data
US 2012/0321549 A1    Dec. 20, 2012

(30) Foreign Application Priority Data

Mar. 29, 2010 (JP) .................................. 2010-074818

(51) Int. Cl.
*C07C 5/10* (2006.01)
*C01B 3/26* (2006.01)

(52) U.S. Cl.
USPC ............................ 423/651; 423/650; 585/252

(58) Field of Classification Search
USPC ........................ 423/648.1, 650, 651; 585/252
See application file for complete search history.

(56) References Cited

U.S. PATENT DOCUMENTS 3,306,706 A * 2/1967 Schuman ...................... 423/651
3,476,818 A * 11/1969 Williams et al. .............. 585/252
(Continued)

FOREIGN PATENT DOCUMENTS

JP    61-201601    *   9/1986
JP    2002-134141 A    5/2002
(Continued)

OTHER PUBLICATIONS

English translation of International Preliminary Report on Patentability and Written Opinion mailed Nov. 1, 2012, in PCT International Application No. PCT/JP2011/057149.
International Search Report for PCT/JP2011/057149 dated May 24, 2011.

(Continued)

*Primary Examiner* — Wayne Langel
(74) *Attorney, Agent, or Firm* — Birch, Stewart, Kolasch & Birch, LLP

(57) ABSTRACT

Provided is a method for producing hydrogen aimed at storage and transportation, by which hydrogen for storage and transportation that is necessary for smoothly performing an organic chemical hydride method can be industrially produced efficiently at low cost. The method is a method for producing hydrogen aimed at storage and transportation in an organic chemical hydride method, in which: the hydrogenation process of an aromatic compound uses, as a hydrogen source for the reaction of the aromatic compound, a reaction gas is produced by a reforming reaction and adjusted a hydrogen concentration from 30 to 70 vol % by a shift reaction; and a hydrogenated aromatic compound is separated from a reaction mixture obtained in the hydrogenation process, which is followed by purification.

5 Claims, 1 Drawing Sheet

(56) References Cited

U.S. PATENT DOCUMENTS

| | | | |
|---|---|---|---|
| 4,346,752 A * | 8/1982 | Kesten et al. | 165/104.12 |
| 4,478,814 A * | 10/1984 | Kesten et al. | 423/650 |
| 4,567,033 A * | 1/1986 | Kesten | 423/658.2 |
| 5,189,233 A * | 2/1993 | Larkin et al. | 585/265 |
| 6,074,447 A * | 6/2000 | Jensen | 48/61 |
| 7,186,396 B2 * | 3/2007 | Ratner et al. | 423/648.1 |
| 7,766,986 B2 * | 8/2010 | Toseland et al. | 48/61 |
| 2007/0140953 A1 * | 6/2007 | Ruettinger et al. | 423/648.1 |

FOREIGN PATENT DOCUMENTS

| | | |
|---|---|---|
| JP | 2007-153726 A | 6/2007 |
| JP | 2007-269522 A | 10/2007 |
| JP | 4279546 B2 | 6/2009 |

OTHER PUBLICATIONS

The Japan Petroleum Institute (ed.), p. 141, 1986.

The Japan Petroleum Institute (ed.), pp. 57-67, 2001.

* cited by examiner

METHOD FOR PRODUCING HYDROGEN AIMED AT STORAGE AND TRANSPORTATION

BACKGROUND OF THE INVENTION

1. Field of the Invention

The present invention relates to a method for producing hydrogen aimed at storage and transportation having a form which is suitable for storage and transportation, in particular, a method for producing hydrogen aimed at storage and transportation with a hydrogenated aromatic compound (organic chemical hydride) produced efficiently at low cost in the organic chemical hydride method, the hydrogenated aromatic compound serving as a hydrogen carrier suitable for bulk storage of hydrogen and/or long distance transportation of hydrogen.

2. Description of the Related Art

In recent years, emission control of carbon dioxide, which is a greenhouse gas, has been gaining momentum. As a result, progress has been made in developing and practically applying hydrogen energy application technologies, which are used for stationary fuel cells, hydrogen vehicles, fuel cell vehicles, and the like. Development has been made intensively for hydrogen storage and transportation technologies to supply hydrogen as a fuel for the stationary fuel cells, hydrogen vehicles, fuel cell vehicles, and the like. Further, as infrastructure for supplying hydrogen to hydrogen vehicles and fuel cell vehicles, the development of a hydrogen station has reached its demonstration stage.

In addition, the hydrogen station includes an on-site type of hydrogen station in which hydrogen is internally produced at station area and an off-site type to which hydrogen produced outside is transported. The former, the on-site hydrogen station, involves a problem in that a large amount of carbon monoxide (CO) is produced as a by-product in the hydrogen production and a considerable amount of carbon dioxide ($CO_2$) is inevitably discharged eventually. Thus, the off-site hydrogen station has been main stream at present.

For the off-site hydrogen station, it is necessary to transport hydrogen produced outside to the hydrogen station. There are known a method for storing and/or transporting hydrogen as compressed hydrogen or liquid hydrogen {for example, see PTL (Patent Literature) No. 1 (JP 4279546 B)} and the so-called organic chemical hydride method, the method involving hydrogenating an aromatic compound such as toluene with hydrogen to be stored, thereby converting the compound into a hydrogenated aromatic compound such as methylcyclohexane (MCH), and then storing and/or transporting the hydrogenated aromatic compound as a chemical in the liquid state at the room temperature under ambient pressure. In particular, the latter, the organic chemical hydride method, is attracting attention because the method does not include a potential risk attributed to ultrahigh pressure or extremely low temperature unlike the former.

For example, "Hydrogen Energy State-of-the-Art Technology" (supervised by Tokio Ohta), NTS Inc. (1995) introduces that the organic chemical hydride method was discussed as an MCH method capable of transporting hydrogen as methylcyclohexane obtained by hydrogenating toluene in the Euro-Quebec Project for producing hydrogen by utilizing electricity generated by abundant hydraulic power in Canada and transporting the hydrogen to Europe across the Atlantic Ocean.

Further, PTL No. 2 (JP 2002-134,141A) proposes a hydrogen storage and supply system for storing or supplying hydrogen by utilizing a hydrogenation reaction to a liquid organic hydrogen storage carrier and a dehydrogenation reaction of a liquid organic hydrogen supply carrier by a metal-supported catalyst, the hydrogen storage and supply system including a hydrogen storage carrier storing part for storing a liquid organic hydrogen storage carrier such as toluene, a hydrogen supply carrier storing part for storing a liquid organic hydrogen supply carrier (hydrogenated aromatic compound) such as methylcyclohexane, a reaction vessel having a metal-supported catalyst for conducting a hydrogenation reaction to the liquid organic hydrogen storage carrier and a dehydrogenation reaction of the liquid organic hydrogen supply carrier, supply means for supplying the liquid organic hydrogen storage carrier or the liquid organic hydrogen supply carrier from the above-mentioned hydrogen storage carrier storing part or the above-mentioned hydrogen supply carrier storing part to the above-mentioned reaction vessel as required, and a hydrogen separator for separating hydrogen generated in the above-mentioned reaction vessel.

Moreover, PTL No. 3 (JP 2007-269,522 A) proposes a storage-transport system of hydrogen by an organic chemical hydride method, including a hydrogen storage system for storing hydrogen as a hydrogenated aromatic compound, a hydrogen supply system for producing hydrogen and an aromatic compound by a dehydrogenation reaction, means for transporting the hydrogenated aromatic compound from the hydrogen storage system to the hydrogen supply system, and recovered aromatic compound transporting means for transporting the aromatic compound from the hydrogen supply system to the hydrogen storage system, the storage-transport system being internally equipped with a reaction inhibitor removal apparatus for removing reaction inhibitors which are poisoning substances to a dehydrogenation catalyst and/or a hydrogenation catalyst, having high storage efficiency of hydrogen, and being capable of easily achieving storage and transportation of hydrogen energy by an organic chemical hydride method (OCH method) with the very simple process.

By the way, many hydrogen supply sources including a water electrolysis process, a gasification process of coal and coke, and by-product hydrogen in refineries are considered. However, at present, the main stream of the hydrogen production is provided from a petroleum refining plant in order to supply a large amount of hydrogen necessary for hydrogenation decomposition for petroleum refining and hydrogenation desulfurization of heavy oil. In the process for hydrogen production, reforming reactions such as a steam reforming reaction, an automatic oxidation reforming reaction, and a partial oxidation reforming reaction are employed by using a naphtha or a natural gas as a feed stock.

In addition, when hydrogen is produced by those reforming reactions, a synthesis gas produced by the reforming reactions includes a large amount of carbon monoxide. Thus, the synthesis gas is purified by causing the carbon monoxide (CO) to react with water vapor ($H_2O$), thereby converting them to carbon dioxide ($CO_2$) and hydrogen ($H_2$) (shift reaction), subsequently subjecting a hydrogen-rich synthesis gas obtained after the shift reaction to acid gas removal treatment, thereby reducing the content of carbon dioxide to about 0.1 to 0.5 vol %, then converting a small amount of remaining carbon monoxide to methane ($CH_4$) in the presence of a hydrogenation catalyst, and carrying out cooling treatment if necessary, to thereby remove by-product methane. Alternatively, in recent years, there have been many cases in which hydrogen purification is carried out by removing an acid gas, carbon monoxide, and methane from a gas after the shift reaction with a pressure swing adsorption (PSA) apparatus, and the resultant hydrogen is commercialized as high-purity hydrogen (99 vol % or more).

Further, Petrochemistry Process, NPTL (Non-Patent Literature) No. 1 {the Japan Petroleum Institute (ed.), pp. 57-67 (1998)} introduces that reforming reaction processes include, in addition to a steam reforming process, a partial oxidation process in which reaction heat is supplied by firing part of hydrocarbon as a material with oxygen and an autothermal reforming process in which reaction is performed in one reaction vessel by combining partial oxidation and steam reforming, and those processes are able to meet a demand for a larger apparatus and to meet a demand for environmental protection, compared with the conventional steam reforming processes. It is further described that progress has also been made in developing a process in which an expensive air separation unit is not used and air is used instead of pure oxygen, however, when nitrogen is separated from a gas of ter a reaction, an accompanying synthesis gas needs to be treated.

On the other hand, Process Handbook, NPTL No. 2 {the Japan Petroleum Institute (ed.), p. 141 (1986)} introduces hydrogenation processes of aromatic compounds which can be used in the organic chemical hydride method. In the process, hydrogenation reaction is carried out in the presence of a hydrogenation catalyst to convert an aromatic compound such as toluene to a hydrogenated aromatic compound such as methylcyclohexane, the amount of heat generation derived from the hydrogenation reaction is large, and hence various methods for removing heat are worked out. One of the methods involves diluting preliminarily hydrogen with an inert gas such as a nitrogen so that a hydrogen concentration is limited to be about 70 vol % or less and then subjecting the resultant mixed gas into the reaction. Thus, it is considered that efficient heat removal allows to carry out reaction at relatively low temperatures at which by-products are produced less. However, a large amount of nitrogen is necessary for the hydrogenation process at a large scale, and when excessive nitrogen is not available, an apparatus for producing nitrogen is required to be provided next to a hydrogenation reaction apparatus.

LIST FOR LITERATURES OF PRIOR ART

Patent Literature (PTL)

[PTL No. 1] JP 4,279,546 B
[PTL No. 2] JP 2002-134,141 A
[PTL No. 3] JP 2007-269,522 A

Non-Patent Literature (NPTL)

[NPTL No. 1] the Japan Petroleum Institute (ed.), pp. 57-67 (1998)
[NPTL No. 2] the Japan Petroleum Institute (ed.), p. 141 (1986)

SUMMARY OF THE INVENTION

In a view of the foregoing, the inventors of the present invention took it as an issue to find a way to industrially produce, efficiently at low cost, hydrogen for storage and transportation that is necessary for smoothly performing an organic chemical hydride method, in order to effectively utilize hydrogen energy necessary for the reduction of carbon dioxide emission, which is a global issue. The inventors have totally examined and intensively studied a reaction process from in a hydrogen production process for producing hydrogen by using a reforming reaction to in a hydrogenation process for producing, by carrying out a hydrogenation reaction of an aromatic compound, hydrogen for storage and transportation which is made up of a hydrogenated aromatic compound. As a result, the inventors have found, contrary to expectations, that the introduction of hydrogen produced by a reforming reaction into the hydrogenation process of an aromatic compound without completely purifying the hydrogen can omit an acid gas removal process and a hydrogen purification process using a PSA apparatus both of which were necessary for producing hydrogen, an oxygen production process can also be omitted in the case of an automatic oxidation reforming reaction and a partial oxidation reforming reaction, and further, a nitrogen production process using an apparatus for producing nitrogen can be omitted in the hydrogenation process of an aromatic compound in the organic chemical hydride method. As a result, the present invention has been completed.

Thus, the present invention provides a method producing hydrogen aimed at storage and transportation, by which hydrogen for storage and transportation that is necessary for smoothly performing an organic chemical hydride method can be industrially produced efficiently at low cost.

That is, the present invention provides a method for producing hydrogen for storage and transportation in an organic chemical hydride method, comprising: producing a hydrogenated aromatic compound in a hydrogenation process in which a hydrogenation reaction of an aromatic compound is carried out in the presence of a hydrogenation catalyst; storing and/or transporting the resultant hydrogenated aromatic compound as hydrogen for storage and transportation; carrying out a dehydrogenation reaction of the hydrogenated aromatic compound in the presence of a dehydrogenation catalyst, thereby producing hydrogen; and using the resultant hydrogen for application, in which: the hydrogenation process of the aromatic compound uses, as a hydrogen source for the reaction of the aromatic compound, a reaction gas which is produced by a reforming reaction and adjusted a hydrogen concentration from 30 to 70 vol % by a shift reaction is reacted with aromatic compound and the hydrogenated aromatic compound is separated from a reaction mixture.

In the present invention, the reforming reaction for producing the reaction gas in the hydrogenation process is not particularly limited. Examples of the reforming reaction preferably include a steam reforming reaction known as a method for producing a synthesis gas in refineries and the like, an automatic oxidation reforming reaction, and a partial oxidation reforming reaction.

Here, the term "steam reforming reaction" refers to a reaction for producing a synthesis gas containing 40 to 70 vol % of hydrogen, 40 to 70 vol % of carbon monoxide, 1 to 20 vol % of carbon dioxide, and 1 to 30 vol % of water by causing water vapor to react with a natural gas and/or hydrocarbons such as naphtha, LPG, or an associated gas produced as a by-product when a natural gas is produced.

Further, the partial oxidation reforming reaction and the automatic oxidation reforming reaction are each reaction for producing synthesis gas containing 40 to 70 vol % of hydrogen, 40 to 70 vol % of carbon monoxide, 1 to 20 vol % of carbon dioxide, and 1 to 30 vol % of water by causing oxygen to react with a natural gas and/or an associated gas produced as a by-product when a natural gas is produced, and are preferably each the reaction for producing the synthesis gas containing 40 to 70 vol % of hydrogen, 40 to 70 vol % of carbon monoxide, 1 to 20 vol % of carbon dioxide, 1 to 30 vol % of water, and 1 to 40 vol % of nitrogen by using air as an oxygen source for reaction.

Reaction conditions in the reforming reaction may be the same conditions as those in conventional reforming reactions, and facilities equipped in refineries and the like can be used without any modification.

Next, the synthesis gas obtained by the reforming reaction is introduced into a CO converter, in which the synthesis gas is subjected to the shift reaction for causing carbon monoxide (CO) in the synthesis gas to react with water vapor ($H_2O$), thereby converting them to hydrogen ($H_2$) and carbon dioxide ($CO_2$). Here, synthesis gases derived from various kinds of reforming reactions are each, in general, subjected to the shift reaction under a two-step reaction condition including a high temperature condition (350 to 450° C. in the presence of an $Fe_2O_3$—$Cr_2O_3$-based catalyst) and a low temperature condition (200 to 300° C. in the presence of a CuO—$Cr_2O_3$—ZnO-based catalyst), thereby producing a hydrogen-rich synthesis gas containing 50 to 70 vol % of hydrogen, 30 to 50 vol % of carbon dioxide, 1 to 20 vol % of water, and 1 to 10 vol % of remaining carbon monoxide.

The gas which became rich in hydrogen after the shift reaction needs to have a hydrogen concentration of at least 30 vol % or more and 70 vol % or less, preferably 50 vol % or more and 70 vol % or less. As a result, the hydrogen-rich gas can be used as a reaction gas for a hydrogen source without any further treatment in the hydrogenation process of an aromatic compound in the organic chemical hydride method. When the reaction gas has a hydrogen concentration of less than 30 vol %, the ratio of a diluting gas becomes larger, causing the problem that a reaction vessel becomes larger than necessary. In contrast, when the reaction gas has a hydrogen concentration of more than 70 vol %, the ratio of a diluting gas becomes smaller, causing the problem that a dilution effect is difficult to be obtained.

Next, in the present invention, the reaction gas made up of a synthesis gas with a hydrogen concentration of 30 to 70 vol % produced by the shift reaction is introduced into directly the hydrogenation process of an aromatic compound in the organic chemical hydride method without hydrogen purification or nitrogen production. In the hydrogenation process, the hydrogenation reaction of an aromatic compound is carried out in the presence of a hydrogenation catalyst, thereby converting the aromatic compound to a hydrogenated aromatic compound serving as hydrogen for storage and transportation, and a methanation reaction of remaining carbon monoxide left in the reaction gas is carried out at the same time.

In the hydrogenation reaction of the aromatic compound, the aromatic compound is hydrogenated in the presence of a hydrogenation catalyst by using the reaction gas as a hydrogen source under conditions of a reaction temperature of 150° C. or more and 250° C. or less, preferably 160° C. or more and 220° C. or less and a reaction pressure of 0.1 MP or more and 5 MP or less, preferably 0.5 MP or more and 3 MP or less, thereby converting the aromatic compound to a hydrogenated aromatic compound. In addition, in the simultaneously occurring methanation reaction, carbon monoxide in the reaction gas is converted to methane.

In the present invention, it is possible to use benzene, toluene, xylene, naphthalene, methylnaphthalene, anthracene, or the like as an aromatic compound to be used in the hydrogenation process. Toluene is preferred from the viewpoint that toluene has a wide range from the melting point to boiling point in which its liquid phase can be kept without using solvent in any global environment. Further, it is possible to use, as a hydrogenation catalyst, a catalyst produced by causing a support such as alumina, silica, or silica-alumina to support an active metal such as platinum, nickel, palladium, rhodium, iridium, or ruthenium. Preferred is nickel or a nickel oxide in which nickel serves as an active metal, from the viewpoint of the selectivity of reactions.

The reaction-producing gas obtained in the hydrogenation process of the aromatic compound is subsequently cooled to 70° C. or less, preferably 40° C. or less, and is then subjected to air-liquid separation to remove carbon dioxide. Water is also separated and removed, and a hydrogenated aromatic compound is recovered as the organic chemical hydride for the carrier of hydrogen for storage and transportation that is commercially marketed.

According to the method for producing hydrogen for storage and transportation of the present invention, hydrogen for storage and transportation that is necessary for smoothly performing an organic chemical hydride method can be industrially produced efficiently at low cost.

DETAILED DESCRIPTION OF THE PREFERRED EMBODIMENTS

Figure 1:
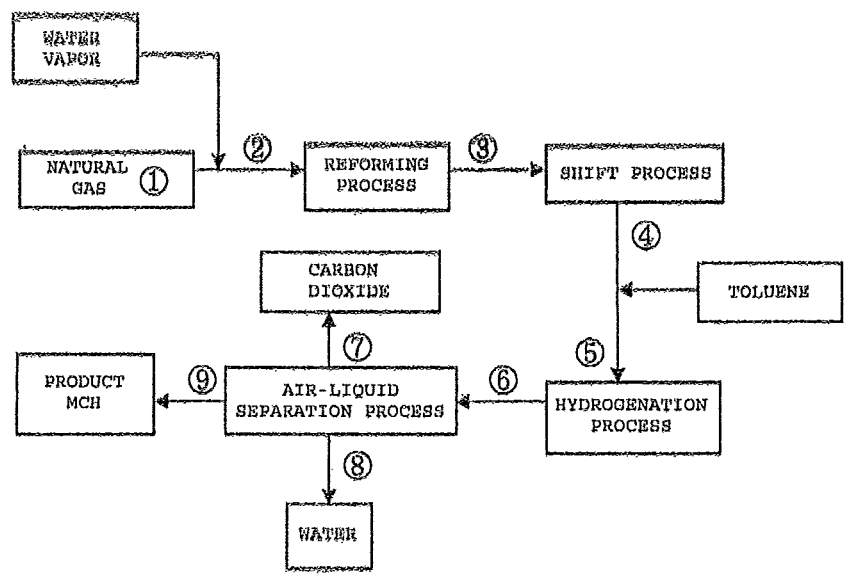
FIG. 1 is an explanatory diagram illustrating a process flow of a method for producing hydrogen for storage and transportation according to a first embodiment of the present invention in a case in which a steam reforming reaction is adopted as a reforming reaction.

Hereinafter, embodiments of the present invention are described more specifically according to the process flows illustrated in the drawings attached.

First Embodiment

FIG. 1 illustrates a process flow of the case in which a steam reforming reaction is adopted as the reforming reaction according to the first embodiment of the present invention.

In the process flow of FIG. 1, the reaction conditions of a reforming reaction in the process were set to 900° C. and 2.15 MPaG, the reaction conditions of a shift reaction in the shift process were set to 250° C. and 2.0 MPaG, and further the reaction conditions of a hydrogenation reaction in the hydrogenation process were set to 250° C. and 1.9 MPaG. Then, a mass balance simulation at each point in the process flow was carried out. Results are shown in Table 1 described below.

TABLE 1

| | Stream No. | | | | | | | | |
|---|---|---|---|---|---|---|---|---|---|
| | 1 | 2 | 3 | 4 | 5 | 6 | 7 | 8 | 9 |
| Reaction temperature (° C.) | 40 | 515 | 900 | 250 | 250 | 250 | 40 | 40 | 40 |
| Pressure (MPaG) | 2.15 | 2.15 | 2.00 | 2.00 | 1.90 | 1.90 | 1.85 | 1.85 | 1.85 |
| Mass balance (NM$^3$/H) | | | | | | | | | |
| $H_2$ | 3.1 | 3.1 | 316.4 | 384.1 | 384.1 | 71.0 | 69.2 | 0.1 | 1.8 |
| CO | 0.0 | 0.0 | 72.3 | 4.6 | 4.6 | 0.0 | 0.0 | 0.0 | 0.0 |
| $CO_2$ | 0.0 | 0.0 | 27.4 | 95.1 | 95.1 | 95.1 | 83.1 | 0.4 | 11.7 |
| $N_2$ | 0.9 | 0.9 | 0.9 | 0.9 | 0.9 | 0.9 | 0.9 | 0.0 | 0.9 |
| $CH_4$ | 92.5 | 92.5 | 13.4 | 13.4 | 13.4 | 18.1 | 17.5 | 0.0 | 0.6 |
| $C_2H_6$ | 3.7 | 3.7 | 0.0 | 0.0 | 0.0 | 0.0 | 0.0 | 0.0 | 0.0 |
| $C_3H_8$ | 2.1 | 2.1 | 0.0 | 0.0 | 0.0 | 0.0 | 0.0 | 0.0 | 0.0 |
| $H_2O$ | 0.0 | 282.8 | 155.7 | 88.0 | 88.0 | 92.7 | 0.6 | 92.0 | 0.0 |
| n-$C_4H_{10}$ | 0.7 | 0.7 | 0.0 | 0.0 | 0.0 | 0.0 | 0.0 | 0.0 | 0.0 |
| iso-$C_4H_{10}$ | 0.4 | 0.4 | 0.0 | 0.0 | 0.0 | 0.0 | 0.0 | 0.0 | 0.0 |
| iso-$C_5H_{12}$ | 0.5 | 0.5 | 0.0 | 0.0 | 0.0 | 0.0 | 0.0 | 0.0 | 0.0 |
| MCH($C_7H_{14}$) | 0.0 | 0.0 | 0.0 | 0.0 | 0.0 | 99.7 | 0.9 | 0.0 | 98.8 |
| Toluene ($C_7H_8$) | 0.0 | 0.0 | 0.0 | 0.0 | 100.0 | 0.3 | 0.0 | 0.0 | 0.3 |
| Total | 103.9 | 386.7 | 586.1 | 586.1 | 686.1 | 377.6 | 172.2 | 92.5 | 114.0 |

Second Embodiment

Figure 2:
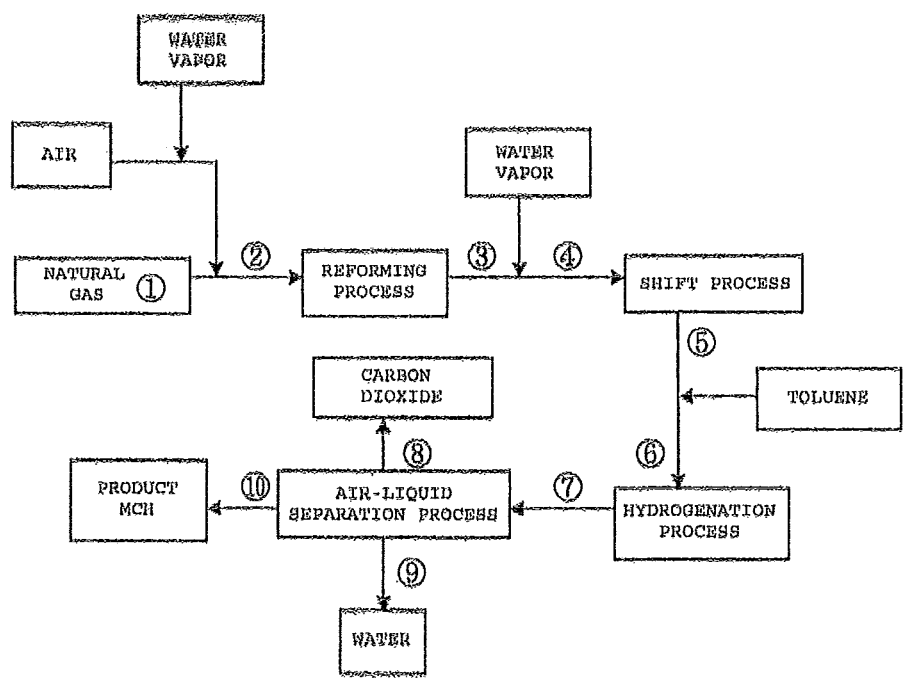
FIG. 2 is an explanatory diagram illustrating a process flow of a method for producing hydrogen for storage and transportation according to a second embodiment of the present invention in a case in which a partial oxidation reforming reaction is adopted as a reforming reaction.

FIG. 2 illustrates a process flow of the case in which a partial oxidation reforming reaction is adopted as the reforming reaction according to the second embodiment of the present invention.

In the process flow of FIG. 1, the reaction conditions of a reforming reaction in the reforming process were set to 1,050° C. and 2.15 MPaG, the reaction conditions of a shift reaction in the shift process were set to 250° C. and 2.0 MPaG, and further the reaction conditions of a hydrogenation reaction in the hydrogenation process were set to 250° C. and 1.9 MPaG. Then, a mass balance simulation at each point in the process flow was carried out. Results are shown in Table 2 described below.

TABLE 2

| | Stream No. | | | | | | | | | |
|---|---|---|---|---|---|---|---|---|---|---|
| | 1 | 2 | 3 | 4 | 5 | 6 | 7 | 8 | 9 | 10 |
| Reaction temperature (° C.) | 40 | 515 | 1,050 | 250 | 250 | 250 | 250 | 40 | 40 | 40 |
| Pressure (MPaG) | 2.15 | 2.15 | 2.00 | 2.00 | 2.00 | 1.91 | 1.91 | 1.85 | 1.85 | 1.85 |
| Mass balance (NM$^3$/H) | | | | | | | | | | |
| $H_2$ | 3.72 | 3.75 | 253.3 | 253.3 | 367.1 | 367.1 | 65.1 | 64.5 | 0.01 | 0.54 |
| CO | 0.00 | 0.00 | 117.2 | 117.2 | 3.34 | 3.34 | 0.00 | 0.00 | 0.00 | 0.00 |
| $CO_2$ | 0.00 | 0.11 | 17.6 | 17.6 | 131.5 | 131.5 | 131.5 | 125.4 | 0.35 | 5.72 |
| $N_2$ | 0.11 | 290.5 | 290.5 | 290.5 | 290.5 | 290.5 | 290.5 | 289.2 | 0.02 | 1.29 |
| $O_2$ | 0.00 | 78.11 | 0.00 | 0.00 | 0.00 | 0.00 | 0.00 | 0.00 | 0.00 | 0.00 |
| $CH_4$ | 111.0 | 111.0 | 1.05 | 1.05 | 1.05 | 1.05 | 4.39 | 4.34 | 0.00 | 0.05 |
| $C_2H_6$ | 4.38 | 4.38 | 0.00 | 0.00 | 0.00 | 0.00 | 0.00 | 0.00 | 0.00 | 0.00 |
| $C_3H_8$ | 2.57 | 2.57 | 0.00 | 0.00 | 0.00 | 0.00 | 0.00 | 0.00 | 0.00 | 0.00 |
| $H_2O$ | 0.00 | 67.87 | 71.91 | 275.5 | 161.7 | 161.7 | 165.0 | 1.84 | 163.2 | 0.00 |
| n-$C_4H_{10}$ | 0.87 | 0.87 | 0.72 | 0.00 | 0.00 | 0.00 | 0.00 | 0.00 | 0.00 | 0.00 |
| iso-$C_4H_{10}$ | 0.52 | 0.52 | 0.44 | 0.00 | 0.00 | 0.00 | 0.00 | 0.00 | 0.00 | 0.00 |
| iso-$C_5H_{12}$ | 0.54 | 0.54 | 0.45 | 0.00 | 0.00 | 0.00 | 0.00 | 0.00 | 0.00 | 0.00 |
| MCH($C_7H_{14}$) | 0.00 | 0.00 | 0.00 | 0.00 | 0.00 | 0.00 | 97.35 | 2.75 | 0.00 | 94.60 |
| Toluene ($C_7H_8$) | 0.00 | 0.00 | 0.00 | 0.00 | 0.00 | 100.0 | 2.65 | 0.05 | 0.00 | 2.60 |
| Total | 123.7 | 560.2 | 753.1 | 955.1 | 955.1 | 1,055.1 | 756.4 | 488.1 | 163.6 | 104.8 |

The results of the mass balance simulation according to the first embodiment and that according to the second embodiment shown in the above Table 1 and Table 2, respectively, indicate that hydrogen-rich synthesis gases each produced by a shift reaction can be used as reaction gases for a hydrogen source that is used in the hydrogenation reaction of an aromatic compound in a hydrogenation process.

EXAMPLES

Example 1

In order to verify the results of the simulation of the first embodiment, a simulated material having the composition shown in Stream No. 5 of FIG. 1 and Stream No. 5 in the item "Stream No." in Table 1 (5 in a circle in FIG. 1 and Table 1) was used to carry out a hydrogenation reaction test. An Ni-supported silica-alumina catalyst commercially available for a hydrogenation reaction was used as a catalyst. 10 cc of the catalyst were filled in a reaction tube in a flow-type reaction tester. The pressure of the reaction tube was raised to 2.0 MPa under hydrogen flow. Further, the temperature of a catalyst layer was raised to 400° C., and this state was kept for 3 hours to carry out the preliminary reduction of the catalyst. Then, the temperature of the catalyst layer was lowered to 220° C. under nitrogen flow, and nitrogen was replaced by a simulated material gas. At this time, the simulated material gas, which had a composition of 67% of hydrogen, 1.0% of carbon monoxide, 17.0% of carbon dioxide, and 15% of water, was supplied into a reaction vessel. Toluene in an amount equivalent to one third of the amount of hydrogen in the simulated material gas was further supplied to carry out a hydrogenation reaction.

When 5 hours passed after the start of the reaction, a fraction at the outlet of the reaction tube was separated to a gas and a liquid. After that, a gas phase sample and a liquid phase sample were subjected to gas chromatography analysis and the water content of the liquid phase sample was measured. The composition of the fraction at the outlet of the reaction tube was determined to be 5.5% of hydrogen, less than 0.1% of carbon monoxide, 31.1% of carbon dioxide, 2.7% of methane, 14.8% of water, 0.7% of toluene, and 32.2% of MCH. From the result, it was found that carbon dioxide and water were inert under the condition of the hydrogenation reaction of toluene in the presence of a nickel catalyst and carbon monoxide was converted to methane by a methanation reaction. In addition, it was found that the conversion rate of hydrogen was about 96% and a good reaction approximately matching to the result of the simulation according to the first embodiment was able to be carried out.

Example 2

Next, in order to verify the results of the simulation of the second embodiment, the same hydrogenation reaction test as in Example 1 was carried out except that a simulated material having the composition shown in Stream No. 6 of FIG. 2 and Stream No. 6 in the item "Stream No." in Table 2 (6 in a circle in FIG. 2 and Table 2) was used. The simulated material gas, which had a composition of 38.0% of hydrogen, 1.0% of carbon monoxide, 14.0% of carbon dioxide, 30.0% of nitrogen, and 17% of water, was supplied into a reaction vessel. When 5 hours passed after the start of the reaction, the composition of the fraction at the outlet of the reaction tube was determined, in the same way as in Example 1, to be 2.6% of hydrogen, less than 0.1% of carbon monoxide, 18.4% of carbon dioxide, 2.6% of methane, 39.4% of nitrogen, 22.3% of water, 0.7% of toluene, and 14.0 of MCH. From the results, it was found that the conversion rate of hydrogen was about 95% and a good reaction approximately matching to the result of the simulation according to the first embodiment was able to be carried out.

What is claimed is:

1. A method for producing hydrogen for storage and transportation by an organic chemical hydride method, comprising:
    producing a hydrogenated aromatic compound by hydrogenating an aromatic compound in the presence of a hydrogenation catalyst;
    separating and purifying the hydrogenated aromatic compound from a reaction mixture;
    storing and/or transporting the resultant hydrogenated aromatic compound as a carrier of hydrogen for storage and transportation;
    dehydrogenating the hydrogenated aromatic compound in the presence of a dehydrogenation catalyst, thereby producing hydrogen; and
    wherein:
        the hydrogenation of the aromatic compound uses a reaction gas produced by a reforming reaction and a shift reaction which adjusts a hydrogen concentration from 30 to 70 vol %; and
        in the hydrogenation process, a methanation reaction of remaining carbon monoxide in the reaction gas is carried out simultaneously with the hydrogenation reaction of the aromatic compound.

2. A method for producing hydrogen aimed at storage and transportation according to claim 1, wherein the reforming reaction is one of a steam reforming reaction, an automatic oxidation reforming reaction, or a partial oxidation reforming reaction.

3. A method for producing hydrogen aimed at storage and transportation according to claim 1 or 2, wherein an oxygen source for reaction used in one of the automatic oxidation reforming reaction or the partial oxidation reforming reaction is air.

4. A method for producing hydrogen aimed at storage and transportation according to claim 1, wherein the aromatic compound comprises toluene and the hydrogenated aromatic compound serving as a carrier of hydrogen aimed at storage and transportation comprises methylcyclohexane.

5. A method for producing hydrogen aimed at storage and transportation according to claim 1, wherein the hydrogenation catalyst used in the hydrogenation process of the aromatic compound is one of nickel or a nickel oxide.

* * * * *